(12) United States Patent
Shimana

(10) Patent No.: US 8,040,081 B2
(45) Date of Patent: Oct. 18, 2011

(54) MOTOR DRIVE APPARATUS, HYBRID DRIVE APPARATUS AND METHOD FOR CONTROLLING MOTOR DRIVE APPARATUS

(75) Inventor: Tomoko Shimana, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/741,281

(22) PCT Filed: Oct. 14, 2008

(86) PCT No.: PCT/JP2008/068538
§ 371 (c)(1),
(2), (4) Date: May 4, 2010

(87) PCT Pub. No.: WO2009/101729
PCT Pub. Date: Aug. 20, 2009

(65) Prior Publication Data
US 2010/0263953 A1    Oct. 21, 2010

(30) Foreign Application Priority Data

Feb. 14, 2008  (JP) .................................. 2008-033426

(51) Int. Cl.
*H02P 5/74* (2006.01)
*H02P 6/12* (2006.01)
*B60W 10/08* (2006.01)

(52) U.S. Cl. ............ 318/34; 318/112; 318/801; 318/53; 363/71; 363/56.03; 180/65.285

(58) Field of Classification Search .................. 318/34, 318/37, 49, 51, 53, 112, 113, 800, 801, 701, 318/706, 707, 430, 432, 700; 361/23, 30, 31, 1; 363/50, 52, 53, 55, 56.01, 56.02, 56.03, 56.04, 71; 180/65.1, 65.21, 65.25, 65.275, 65.285

See application file for complete search history.

(56) References Cited

U.S. PATENT DOCUMENTS
4,896,089 A * 1/1990 Kliman et al. ................. 318/701
(Continued)

FOREIGN PATENT DOCUMENTS
JP    02299498 A * 12/1990
(Continued)

OTHER PUBLICATIONS

International Search Report issued in International Application No. PCT/JP2008/068538 on Dec. 2, 2008 (with translation).

*Primary Examiner* — Eduardo Colon Santana
(74) *Attorney, Agent, or Firm* — Oliff & Berridge, PLC

(57) ABSTRACT

If any short-circuit failure occurs in an inverter, then a motor generator is used to execute a safety driving. If the rotational speed of a motor generator calculated from a detection value of a position sensor exceeds a predetermined reference rotational speed during the safety driving, an MGECU turns on all of the switching elements connected in parallel to a switching element in which a short-circuit failure occurs with respect to a power supply line. If the rotational speed is equal to or less than the reference rotational speed, the MGECU turns on only the switching elements connected in series to the switching element in which the short-circuit failure occurs. In this way, any excessive currents can be prevented from occurring in the inverter without restricting the safety driving.

12 Claims, 9 Drawing Sheets

U.S. PATENT DOCUMENTS

| | | | |
|---|---|---|---|
| 5,448,442 A * | 9/1995 | Farag | 361/24 |
| 5,708,576 A * | 1/1998 | Jones et al. | 363/56.03 |
| 6,278,256 B1 | 8/2001 | Aoyama | |
| 7,095,206 B2 * | 8/2006 | Lequesne et al. | 318/254.1 |
| 7,339,803 B2 * | 3/2008 | Nojima | 363/37 |
| 7,372,676 B2 * | 5/2008 | Cullen et al. | 361/31 |
| 7,733,616 B2 * | 6/2010 | Yamada | 361/31 |
| 2007/0216327 A1 | 9/2007 | Sugita | |
| 2009/0058339 A1 * | 3/2009 | Kitano | 318/400.22 |
| 2009/0195199 A1 * | 8/2009 | Ito | 318/400.22 |
| 2010/0036555 A1 * | 2/2010 | Hosoda et al. | 701/22 |
| 2010/0060222 A1 * | 3/2010 | Kezobo et al. | 318/490 |
| 2010/0063660 A1 * | 3/2010 | Uchida | 701/22 |
| 2010/0152940 A1 * | 6/2010 | Mitsutani et al. | 701/22 |
| 2010/0244558 A1 * | 9/2010 | Mitsutani et al. | 307/9.1 |
| 2010/0296204 A1 * | 11/2010 | Ichikawa et al. | 361/15 |
| 2011/0043152 A1 * | 2/2011 | Kidokoro et al. | 318/490 |
| 2011/0074333 A1 * | 3/2011 | Suzuki | 318/724 |
| 2011/0140526 A1 * | 6/2011 | Weidenheimer et al. | 307/71 |

FOREIGN PATENT DOCUMENTS

| | | | |
|---|---|---|---|
| JP | A-8-182105 | | 7/1996 |
| JP | 11089003 A | * | 3/1999 |
| JP | A-2002-51569 | | 2/2002 |
| JP | A-2006-170120 | | 6/2006 |
| JP | A-2007-28733 | | 1/2007 |
| JP | A-2007-244126 | | 9/2007 |
| JP | A-2007-245966 | | 9/2007 |
| JP | A-2008-11683 | | 1/2008 |

* cited by examiner (COMMAND FOR TURNING ON ONLY SWITCHING ELEMENT: ONE-PHASE SHORT-CIRCUIT CONTROL)

(COMMAND FOR TURNING ON ONLY SWITCHING ELEMENTS Q3 AND Q5: THREE-PHASE ON CONTROL)

MOTOR DRIVE APPARATUS, HYBRID DRIVE APPARATUS AND METHOD FOR CONTROLLING MOTOR DRIVE APPARATUS

TECHNICAL FIELD

The present invention relates to a motor drive apparatus, a hybrid drive apparatus and a method for controlling the motor drive apparatus. More particularly, the present invention relates to a motor drive apparatus and a hybrid drive apparatus configured to include a plurality of motors coupled to be capable of outputting motive power to a common output shaft, and a method for controlling the motor drive apparatus.

BACKGROUND ART

Recently, a hybrid vehicle has been receiving attention as an environmentally friendly vehicle. The hybrid vehicle has, as power sources, a DC power supply, an inverter, and a motor driven by the inverter, in addition to a conventional engine. In other words, the hybrid vehicle obtains the power sources by driving the engine, and in addition, by converting a DC voltage from the DC power supply to an AC voltage through the use of the inverter and rotating the motor with the converted AC voltage.

As one type of such hybrid vehicle, Japanese Patent Laying-Open No. 2007-28733 (Patent Document 1), for example, discloses a so-called parallel hybrid vehicle. In the parallel hybrid vehicle, a part of motive power output from an engine is transmitted to a drive shaft through a power split device having a first motor generator, and the remaining motive power is regenerated as electric power by the first motor generator. This electric power is used to charge a battery or to drive a second motor generator serving as a power source other than the engine.

In such parallel hybrid vehicle, however, when an abnormality occurs in the engine or the first motor generator, the normal vehicle traveling in which the engine is used as a main power source becomes impossible. For this reason, Patent Document 1 discloses a technique of performing a limp-home operation using the second motor generator within the performance range determined in accordance with the charging amount of a secondary battery, when the engine or the first motor generator is abnormal, and thereby extending the distance traveled during the limp-home operation.

During such limp-home operation, the first motor generator rotates with the rotation of the second motor generator, because the first and second motor generators are coupled to the same output shaft. For this reason, when a short-circuit fault is occurring within an inverter connected to the first motor generator, a short-circuit current may be generated within the inverter during the limp-home operation, due to an induced voltage generated at the first motor generator.

Therefore, the vehicle in Patent Document 1 is configured to restrict the limp-home operation using the second motor generator when an excessive current flows through the inverter connected to the first motor generator during the limp-home operation. As a result, the occurrence of further damage to elements resulting from the generation of a high temperature exceeding the heat-resistant temperature of inverter components due to the excessive short-circuit current is prevented.

Patent Document 1: Japanese Patent Laying-Open No. 2007-28733
Patent Document 2: Japanese Patent Laying-Open No. 2006-170120
Patent Document 3: Japanese Patent Laying-Open No. 2007-245966
Patent Document 4: Japanese Patent Laying-Open No. 8-182105
Patent Document 5: Japanese Patent Laying-Open No. 2007-244126

DISCLOSURE OF THE INVENTION

Problems to be Solved by the Invention

In the configuration in which the operation of the second motor generator is restricted in accordance with the current flowing through the inverter connected to the first motor generator as in Patent Document 1, however, while the occurrence of further damage to the elements due to the excessive short-circuit current can be prevented, an increase in the distance traveled during the limp-home operation is limited. Therefore, there is a possibility that the vehicle cannot be evacuated to a safe place.

Accordingly, it is required to achieve both the protection of the elements in the inverter and the increase in the distance traveled during the limp-home operation in order to further enhance the fail safe function of ensuring the safety of the vehicle when the abnormality occurs.

Therefore, the present invention has been made to solve the above problems, and an object thereof is as follows: in a motor drive apparatus and a hybrid drive apparatus including a plurality of motors coupled to a common output shaft, when an abnormality occurs in one motor, to perform the limp-home operation using another motor, and at this time, to achieve both protection of elements in a motor drive circuit corresponding to the abnormal motor and increase in the distance traveled during the limp-home operation.

Means for Solving the Problems

According to an aspect of the present invention, a motor drive apparatus includes: a plurality of multiphase AC motors coupled to be capable of outputting motive power to a common output shaft; a plurality of power converting devices connected to the plurality of multiphase AC motors, respectively; and a controller for controlling the plurality of power converting devices. Each of the plurality of power converting devices includes a plurality of arm circuits connected to respective phase coils of the multiphase AC motor. Each of the plurality of arm circuits has first and second switching elements connected in series between first and second power supply lines with a connection point to the each phase coil interposed. The controller includes: an abnormality control unit, when a first power converting device among the plurality of power converting devices is abnormal, for instructing an abnormal state operation using a second multiphase AC motor different from a first multiphase AC motor connected to the first power converting device; a short circuit detecting unit for detecting a short-circuited switching element based on a current flowing through the first power converting device as a result of operation of the second multiphase AC motor, in the abnormal state operation; a first motor control unit for controlling the current flowing through the first power converting device by bringing into conduction a switching element connected in series to the short-circuited switching element with the connection point interposed, in the abnormal state operation; a second motor control unit for controlling the current flowing through the first power converting device by bringing into conduction all of switching elements connected in parallel to the short-circuited switching element in the power supply line, in the abnormal state operation; and a selecting unit for selectively setting the first motor control unit and the second motor control unit in accordance with a rotation speed of the first multiphase AC motor.

Preferably, the selecting unit selects the first motor control unit when the rotation speed of the first multiphase AC motor is less than or equal to a prescribed reference rotation speed, and selects the second motor control unit when the rotation speed of the first multiphase AC motor exceeds the prescribed reference rotation speed.

Preferably, when the first motor control unit is executed, the first multiphase AC motor has a first characteristic that braking torque generated as a result of operation of the second multiphase AC motor becomes larger as the rotation speed of the first multiphase AC motor increases. When the second motor control unit is executed, the first multiphase AC motor has a second characteristic that the braking torque generated as a result of operation of the second multiphase AC motor becomes smaller as the rotation speed of the first multiphase AC motor increases. The selecting unit has the first and second characteristics in advance, and sets, to the prescribed reference rotation speed, the rotation speed of the first multiphase AC motor when the braking torque generated at the first multiphase AC motor having the first characteristic matches that generated at the first multiphase AC motor having the second characteristic.

According to another aspect of the present invention, a hybrid drive apparatus includes: an engine operated by fuel; a first motor generator; an output member for outputting motive power; a power split device coupling the output member, an output shaft of the engine and an output shaft of the first motor generator to one another; a second motor generator coupled to the output member; a first inverter connected between a DC power supply and the first motor generator, for drive control of the first motor generator; a second inverter connected between the DC power supply and the second motor generator, for drive control of the second motor generator; and a controller for controlling operation of the first and second motor generators. The first inverter includes a plurality of first arm circuits connected to respective phase coils of the first motor generator. The second inverter includes a plurality of second arm circuits connected to respective phase coils of the second motor generator. Each of the plurality of first and second arm circuits has first and second switching elements connected in series between first and second power supply lines with a connection point to the each phase coil interposed. The controller includes: an abnormality control unit for instructing an abnormal state operation using the second motor generator, when the first inverter is abnormal; a short circuit detecting unit for detecting a short-circuited switching element based on a current flowing through the first inverter as a result of operation of the second motor generator, in the abnormal state operation; a first motor control unit for controlling the current flowing through the first inverter by bringing into conduction a switching element connected in series to the short-circuited switching element with the connection point interposed, in the abnormal state operation; a second motor control unit for controlling the current flowing through the first inverter by bringing into conduction all of switching elements connected in parallel to the short-circuited switching element in the power supply line, in the abnormal state operation; and a first selecting unit for selectively setting the first motor control unit and the second motor control unit in accordance with a rotation speed of the first motor generator.

Preferably, the first selecting unit selects the first motor control unit when the rotation speed of the first motor generator is less than or equal to a prescribed reference rotation speed, and selects the second motor control unit when the rotation speed of the first motor generator exceeds the prescribed reference rotation speed.

Preferably, the abnormality control unit instructs the abnormal state operation using the engine and the first motor generator, when the second inverter is abnormal. The short circuit detecting unit detects the short-circuited switching element based on a current flowing through the second inverter as a result of operation of the first motor generator, in the abnormal state operation. The controller further includes: a third motor control unit for controlling the current flowing through the second inverter by bringing into conduction the switching element connected in series to the short-circuited switching element with the connection point interposed, in the abnormal state operation; a fourth motor control unit for controlling the current flowing through the second inverter by bringing into conduction all of the switching elements connected in parallel to the short-circuited switching element in the power supply line, in the abnormal state operation; and a second selecting unit for selectively setting the third motor control unit and the fourth motor control unit in accordance with a rotation speed of the second motor generator.

Preferably, the second selecting unit selects the third motor control unit when the rotation speed of the second motor generator is less than or equal to a prescribed reference rotation speed, and selects the fourth motor control unit when the rotation speed of the second motor generator exceeds the prescribed reference rotation speed.

According to another aspect of the present invention, the present invention is directed to a method for controlling a motor drive apparatus including a plurality of multiphase AC motors coupled to be capable of outputting motive power to a common output shaft and a plurality of power converting devices connected to the plurality of multiphase AC motors, respectively. Each of the plurality of power converting devices includes a plurality of arm circuits connected to respective phase coils of the multiphase AC motor. Each of the plurality of arm circuits has first and second switching elements connected in series between first and second power supply lines with a connection point to the each phase coil interposed. The method for controlling includes the steps of: instructing an abnormal state operation using a second multiphase AC motor different from a first multiphase AC motor connected to a first power converting device among the plurality of power converting devices, when the first power converting device is abnormal; detecting a short-circuited switching element based on a current flowing through the first power converting device as a result of operation of the second multiphase AC motor, in the abnormal state operation; controlling the current flowing through the first power converting device by bringing into conduction a switching element connected in series to the short-circuited switching element with the connection point interposed, in the abnormal state operation; controlling the current flowing through the first power converting device by bringing into conduction all of switching elements connected in parallel to the short-circuited switching element in the power supply line, in the abnormal state operation; and in accordance with a rotation speed of the first multiphase AC motor, selectively setting the step of controlling the current flowing through the first power converting device by bringing into conduction the switching element connected in series to the short-circuited switching element with the connection point interposed, and the step of controlling the current flowing through the first power converting device by bringing into conduction all of the switching elements connected in parallel to the short-circuited switching element in the power supply line.

Preferably, the step of selectively setting selects the step of controlling the current flowing through the first power converting device by bringing into conduction the switching element connected in series to the short-circuited switching element with the connection point interposed, when the rotation speed of the first multiphase AC motor is less than or equal to a prescribed reference rotation speed, and selects the step of controlling the current flowing through the first power converting device by bringing into conduction all of the switching elements connected in parallel to the short-circuited switching element in the power supply line, when the rotation speed of the first multiphase AC motor exceeds the prescribed reference rotation speed.

Effects of the Invention

According to the present invention, in the motor drive apparatus and the hybrid drive apparatus including the plurality of motors coupled to the common output shaft, when an abnormality occurs in one motor, the limp-home operation using another motor is performed, and at this time, both protection of elements in a motor drive circuit corresponding to the abnormal motor and increase in the distance traveled during the limp-home operation can be achieved.

Figure 1:
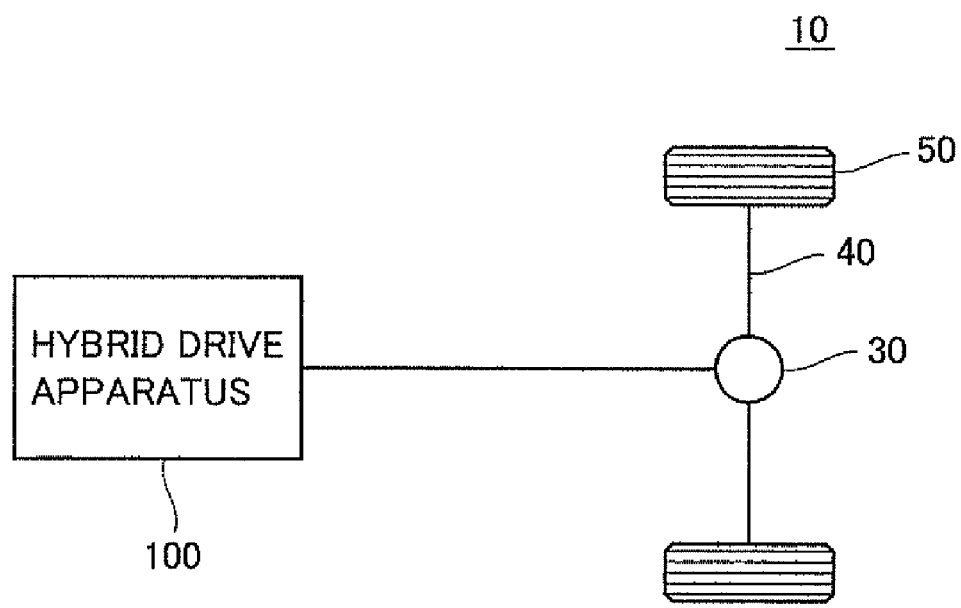
FIG. 1 is a block diagram illustrating a schematic configuration of a hybrid vehicle 10 including a hybrid drive apparatus according to an embodiment of the present invention.

DESCRIPTION OF THE REFERENCE SIGNS 10 hybrid vehicle; 13 voltage sensor; 14, 31 inverter; 15 U-phase arm; 16 V-phase arm; 17 W-phase arm; 18 to 20 conductive line; 22, 26 position sensor; 24, 28 current sensor; 30 differential gear; 32 motor control phase voltage calculating unit; 34 inverter drive signal converting unit; 36 inverter abnormality detecting unit; 38 short-circuited element detecting unit; 40 drive shaft; 50 drive wheel; 100 hybrid drive apparatus; 114 damper device; 118 output member; 120c carrier; 120s sun gear; 120r ring gear; 122r rotor; 124 motor shaft; 126 output gear wheel; 128 intermediate shaft; 130 main gear wheel; 132 small gear wheel; 140 DC power supply; 200 HVECU; 300 MGECU; C2 smoothing capacitor; D1 to D6 diode; ENG engine; MG1, MG2 motor generator; PM magnet; PSD power split device; Q1 to Q6 switching element; SL ground line; SR1, SR2 system relay; VL power supply line

BEST MODES FOR CARRYING OUT THE INVENTION

Embodiments of the present invention will be described in detail hereinafter with reference to the drawings. It is noted that the same reference characters designate the same or corresponding portions in the drawings.

FIG. 1 is a block diagram illustrating a schematic configuration of a hybrid vehicle 10 including a hybrid drive apparatus 100 according to an embodiment of the present invention. It is noted that hybrid drive apparatus 100 is shown as a typical example of a motor drive circuit including: a plurality of motors coupled to be capable of outputting motive power to a common output shaft; and a plurality of motor drive circuits connected to these plurality of motors, respectively.

Referring to FIG. 1, hybrid vehicle 10 includes hybrid drive apparatus 100, a differential gear 30, a drive shaft 40, and a drive wheel 50.

Hybrid drive apparatus 100 has an engine (internal combustion engine) and two motor generators built therein, and generates an output by cooperative control of the engine and the motor generators. The output of hybrid drive apparatus 100 is transmitted to drive shaft 40 through differential gear 30 and is used for rotationally driving drive wheel 50. Differential gear 30 absorbs a difference in rotation between right and left drive wheels 50 by utilizing a difference in resistance from a road surface.

Figure 2:
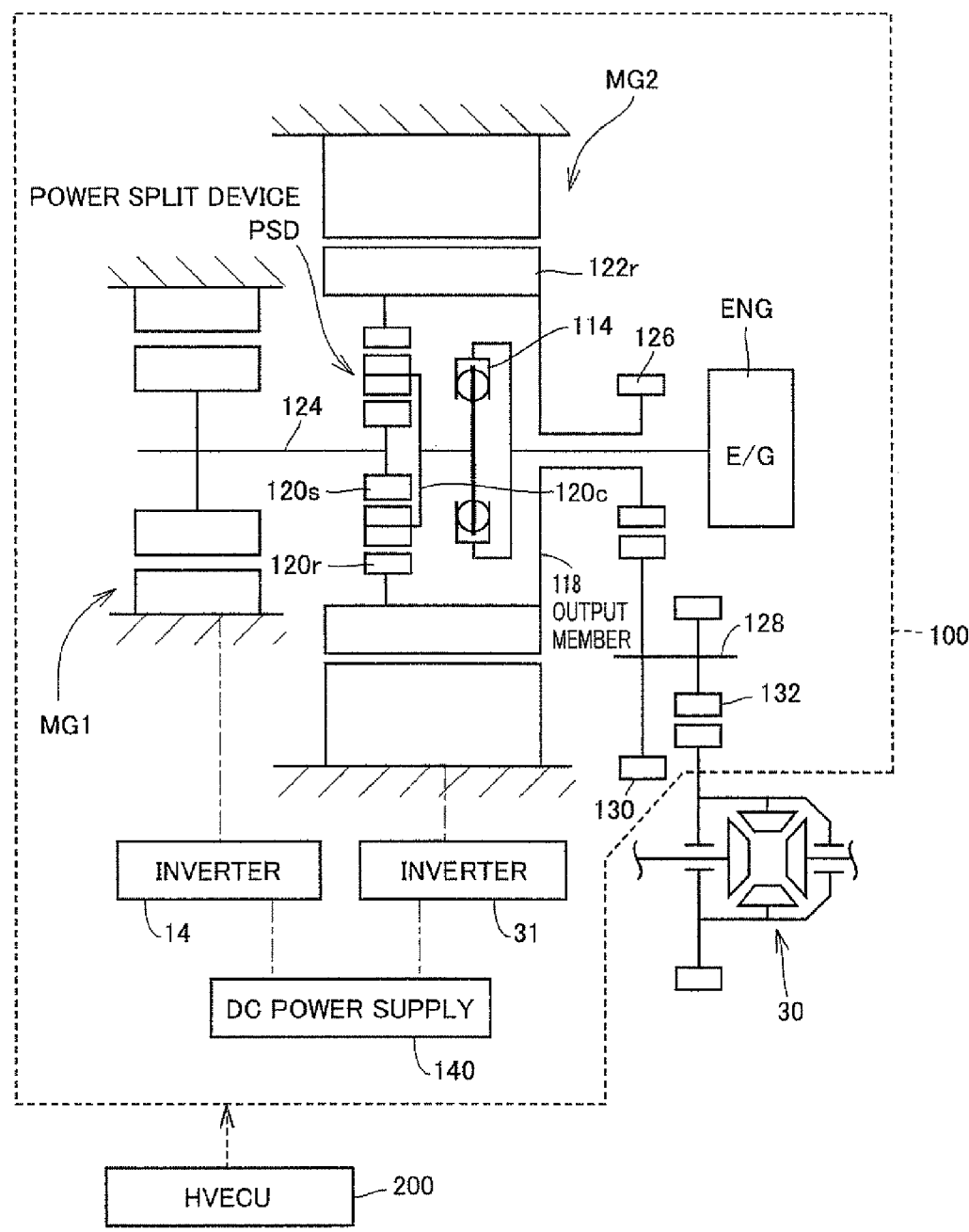
FIG. 2 is a block diagram describing a configuration of the hybrid drive apparatus shown in FIG. 1 in detail.

FIG. 2 is a block diagram describing a configuration of hybrid drive apparatus 100 shown in FIG. 1 in detail.

Referring to FIG. 2, hybrid drive apparatus 100 includes an engine ENG such as an internal combustion engine operated by combustion of fuel, a spring-type damper device 114 for absorbing rotational fluctuations of engine ENG, a planetary gear-type power split device PSD for mechanically distributing the output of engine ENG transmitted through damper device 114 to a motor generator MG1 and an output member 118, and a motor generator MG2 for applying the rotational force to output member 118.

Engine ENG, damper device 114, power split device PSD, and motor generator MG1 are axially arranged side by side on a common shaft, and motor generator MG2 is concentrically placed on the outer circumferential side of damper device 114 and power split device PSD.

Power split device PSD is a single pinion-type planetary gear device, and includes a sun gear 120s coupled to a motor shaft 124 of motor generator MG1, a carrier 120c coupled to damper device 114, and a ring gear 120r coupled to rotor 122r of motor generator MG2, as three rotary elements.

Output member 118 is integrally fixed to rotor 122r of motor generator MG2 by a bolt and the like, and is coupled to ring gear 120r of power split device PSD with rotor 122r interposed therebetween. Output member 118 is provided with an output gear wheel 126. Bevel gear-type differential gear 30 is slowed down and rotated by a main gear wheel 130 and a small gear wheel 132 of an intermediate shaft 128, to distribute motive power to drive wheel 50 shown in FIG. 1.

Output gear wheel 126 is provided with a parking lock brake mechanism (not shown) for locking an output from output member 118. The parking lock brake mechanism limits output of driving force from hybrid drive apparatus 100 by locking output gear wheel 126 when the driver selects a parking position (P position).

Motor generator MG1 and motor generator MG2 are electrically connected to a DC power supply 140 with an inverter 14 and an inverter 31 interposed therebetween, respectively.

The operation of these motor generators MG1 and MG2 is switched among a rotationally driven state in which motor generators MG1 and MG2 are supplied with electric energy from DC power supply 140 and rotationally driven at prescribed torque, a charging state in which motor generators MG1 and MG2 function as generators to charge DC power supply 140 with electric energy as a result of rotational braking (electrical braking torque of the motor generators themselves), and a no-load state in which free rotation of motor shaft 124 and rotor 122r is allowed.

An HVECU (Electronic Control Unit) 200 performs signal processing in accordance with a preset program to switch the traveling mode by motor generators MG1 and MG2 among the motor traveling, the charging traveling, the engine and motor traveling, and the like, depending on the driving conditions.

In the motor traveling, for example, motor generator MG1 is set to the no-load state and motor generator MG2 is set to the rotationally driven state, and hybrid vehicle 10 travels by using only motor generator MG2 as a power source. In the charging traveling, motor generator MG1 functions as a generator and motor generator MG2 is set to the no-load state. While hybrid vehicle 10 travels by using only engine ENG as a source of driving force, DC power supply 140 is charged by motor generator MG1.

Or, in the engine and motor traveling, motor generator MG1 functions as a generator, and while hybrid vehicle 10 travels by using both engine ENG and motor generator MG2 as power sources, DC power supply 140 is charged by motor generator MG1.

In addition, HVECU 200 also exercises the regenerative braking control in which motor generator MG2 functions as a generator for regenerative braking at the time of the above motor traveling, the charging control in which motor generator MG1 functions as a generator and engine ENG is operated when the vehicle stops, and DC power supply 140 is charged entirely by motor generator MG1, and the like.

HVECU 200 generates a torque command value for each of motor generators MG1 and MG2 such that desired driving force and electric power is generated in each traveling mode. In addition, engine ENG automatically stops when the vehicle stops, whereas the start timing thereof is controlled by HVECU 200, depending on the driving conditions.

Specifically, at the start of traveling and at the time of light load during low-speed traveling or during descent on a gentle slope, hybrid vehicle 10 travels by using the driving force generated by motor generator MG2 without starting engine ENG, in order to avoid a region in which engine efficiency is bad. When hybrid vehicle 10 enters the driving state in which the driving force above a certain level is required, engine ENG starts. When it is required to drive engine ENG for warm-up and the like, however, engine ENG starts in the no-load state at the start of traveling, and is driven at the idling engine speed until the desired warm-up is implemented. In addition, engine ENG also starts when the above charging control is exercised at the time of parking of the vehicle.

Figure 3:
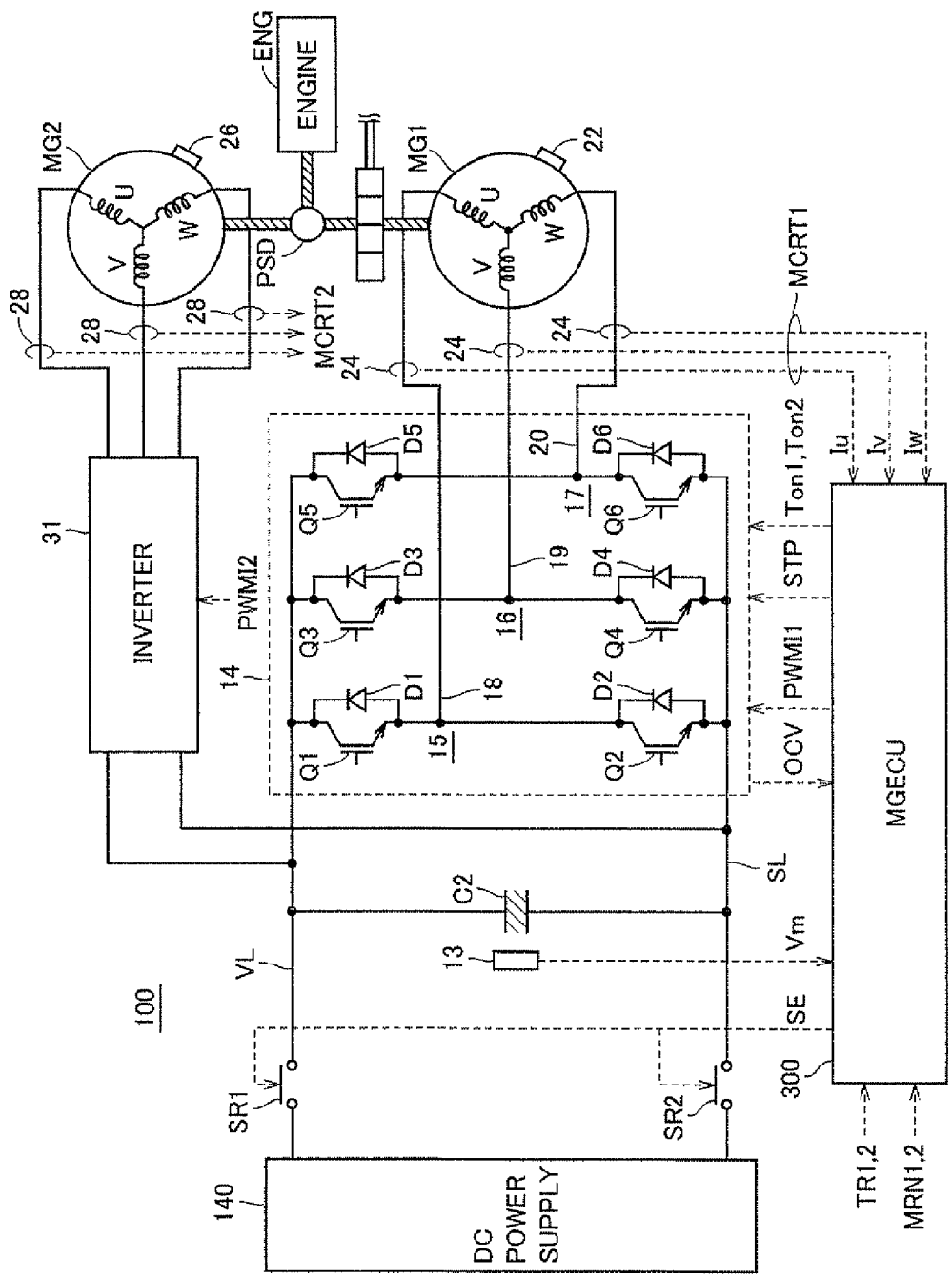
FIG. 3 is a circuit diagram illustrating an electrical configuration of the hybrid drive apparatus shown in FIG. 2.

FIG. 3 is a circuit diagram illustrating an electrical configuration of hybrid drive apparatus 100 shown in FIG. 2.

Referring to FIG. 3, hybrid drive apparatus 100 further includes DC power supply 140, a voltage sensor 13, system relays SR1 and SR2, a smoothing capacitor C2, inverters 14 and 31, current sensors 24 and 28, position sensors 22 and 26, and an MGECU 300.

DC power supply 140 is configured to include a power storage device (not shown) and outputs a DC voltage between a power supply line VL and a ground line SL. For example, DC power supply 140 can be configured to convert an output voltage of a secondary battery and output the converted voltage to power supply line VL and ground line SL by a combination of the secondary battery and a step-up and down converter. In this case, the step-up and down converter is configured to allow bidirectional power conversion, and converts the DC voltage between power supply line VL and ground line SL to a charging voltage for the secondary battery.

System relay SR1 is connected between a positive electrode of DC power supply 140 and power supply line VL, and system relay SR2 is connected between a negative electrode of DC power supply 140 and ground line SL. System relays SR1 and SR2 are turned on/off in response to a signal SE from MGECU 300.

Smoothing capacitor C2 is connected between power supply line VL and ground line SL. Voltage sensor 13 detects a voltage Vm across smoothing capacitor C2 (which corresponds to an input voltage of inverters 14 and 31, and the same is applied in the following), and outputs voltage Vm to MGECU 300.

Inverter 14 connected to motor generator MG1 includes a U-phase arm 15, a V-phase arm 16 and a W-phase arm 17. U-phase arm 15, V-phase arm 16 and W-phase arm 17 are provided in parallel between power supply line VL and ground line SL.

U-phase arm 15 includes serially-connected power semiconductor switching elements (that will also be simply referred to as switching elements hereinafter) Q1 and Q2. V-phase arm 16 includes serially-connected switching elements Q3 and Q4. W-phase arm 17 includes serially-connected switching elements Q5 and Q6. In addition, between the collector and the emitter of each of switching elements Q1 to Q6, diodes D1 to D6 causing current flow from the emitter side to the collector side are connected, respectively. An IGBT (Insulated Gate Bipolar Transistor), for example, is applied as the switching element in the present embodiment. On/off, that is, switching of switching elements Q1 to Q6 is controlled in response to a switching control signal PWMI1 from MGECU 300.

The midpoint of each phase arm is connected to an end of each phase of each phase coil of motor generator MG1 via a conductive line (wire harness). In other words, motor generator MG1 is a three-phase permanent magnet motor, having three coils of U, V and W phases commonly connected at one end to the neutral point. The U-phase coil has its the other end connected to the midpoint between IGBT elements Q1 and Q2 via a conductive line 18, the V-phase coil has its the other end connected to the midpoint between IGBT elements Q3 and Q4 via a conductive line 19, and the W-phase coil has its the other end connected to the midpoint between IGBT elements Q5 and Q6 via a conductive line 20.

Current sensor 24 is provided at each of conductive lines 18 to 20. Current sensor 24 detects a current MCRT1 flowing to motor generator MG1. It is noted that, since the sum of motor currents Iu, Iv and Iw (instantaneous values) of the U, V and W phases is zero, hybrid drive apparatus 100 may be configured such that current sensor 24 arranged at the two phases detects the motor current of each phase. Current value MCRT1 detected by current sensor 24 is delivered to MGECU 300.

Position sensor 22 for detecting a rotation angle of a rotor (not shown) is further arranged at motor generator MG1. The rotation angle detected by position sensor 22 is delivered to MGECU 300.

Inverter 31 connected to motor generator MG2 has a configuration similar to that of inverter 14. In other words, inverter 31 includes switching elements Q1 to Q6 and diodes D1 to D6. On/off (switching) of switching elements Q1 to Q6 is controlled in response to a switching control signal PWMI2 from MGECU 300.

Motor generator MG2 is a three-phase permanent magnet motor, having three coils of the U, V and W phases commonly connected at one end to the neutral point, similarly to motor generator MG1. The midpoints of the respective phase arms of inverter 31 are electrically connected to the U-phase coil, the V-phase coil and the W-phase coil of motor generator MG2 via conductive lines, respectively.

Current sensor 28 similar to current sensor 24 is provided at the conductive line connecting inverter 31 and each phase coil of motor generator MG2. Furthermore, position sensor 26 similar to position sensor 22 is also arranged at motor generator MG2. A current value MCRT2 detected by current sensor 28 and a value detected by the position sensor are delivered to MGECU 300.

It is noted that, in addition to the values detected by current sensors 24 and 28 as well as position sensors 22 and 26, input voltage Vm of each of inverters 14 and 31 that is detected by voltage sensor 13, a voltage between the terminals of the coils of motor generators MG1 and MG2 detected by an appropriately provided sensor (not shown), and the like are input to MGECU 300 and used for motor drive control.

MGECU 300 receives an operation command for motor generator MG1 from not-shown HVECU 200. This operation command includes an instruction for permitting/prohibiting the operation of motor generator MG1, a torque command value TR1, a rotation speed command MRN1, and the like. By feedback control based on the values detected by current sensor 24 and position sensor 22, MGECU 300 generates switching control signal PWMI1 for controlling the switching operation of switching elements Q1 to Q6 such that motor generator MG1 operates in accordance with the operation command from HVECU 200.

For example, when HVECU 200 issues the operation command for motor generator MG1, MGECU 300 generates switching control signal PWMI1 for converting the DC voltage between power supply line VL and ground line SL to the AC voltage to be applied to each phase coil of motor generator MG1, such that the motor currents of the respective phases in accordance with torque command value TR1 of motor generator MG1 are supplied.

At the time of regenerative braking of motor generator MG1, MGECU 300 generates switching control signal PWMI1 to convert the AC voltage generated by motor generator MG1 to the DC voltage between power supply line VL and ground line SL. In these cases, switching control signal PWMI1 is generated by the feedback control in accordance with, for example, the well-known PWM control scheme, in which the values detected by the sensors are used.

On the other hand, when HVECU 200 issues the instruction for prohibiting the operation of motor generator MG1, MGECU 300 generates a switching control signal STP to stop (all OFF) the switching operation of each of switching elements Q1 to Q6 forming inverter 14.

Furthermore, when receiving an operation command for motor generator MG2 from HVECU 200, MGECU 300 generates switching control signal PWMI2 for controlling the switching operation of switching elements Q1 to Q6 such that motor generator MG2 operates in accordance with the operation command from HVECU 200, by the feedback control based on the values detected by current sensor 28 and position sensor 26, similarly to the control over motor generator MG1 described above.

In addition, information about an abnormality in inverters 14 and 31 detected by MGECU 300 is delivered to HVECU 200. HVECU 200 is configured to be capable of reflecting this abnormality information in the operation commands for motor generators MG1 and MG2.

In the configuration shown in FIGS. 2 and 3, motor generators MG1 and MG2 correspond to "a plurality of multiphase AC motors" in the present invention, and inverters 14 and 31 correspond to "a plurality of power converting devices" in the present invention. In addition, MGECU 300 and HVECU 200 correspond to "controller" in the present invention.

(Limp-Home Operation of Hybrid Vehicle)

In hybrid vehicle 10 configured as described above, when motor generator MG1 cannot be used because of the abnormality in inverter 14 connected to motor generator MG1, the operation of engine ENG and motor generator MG1 is stopped and "limp-home operation" of hybrid vehicle 10 can be performed by "abnormal state operation" in which motive power generated by motor generator MG2 is used, as is also described in Patent Document 1.

During such limp-home operation, motor generator MG1 rotates with the operation (rotation) of motor generator MG2, because motor generator MG1 and motor generator MG2 are coupled to each other with power split device PSD interposed therebetween.

Figure 4:
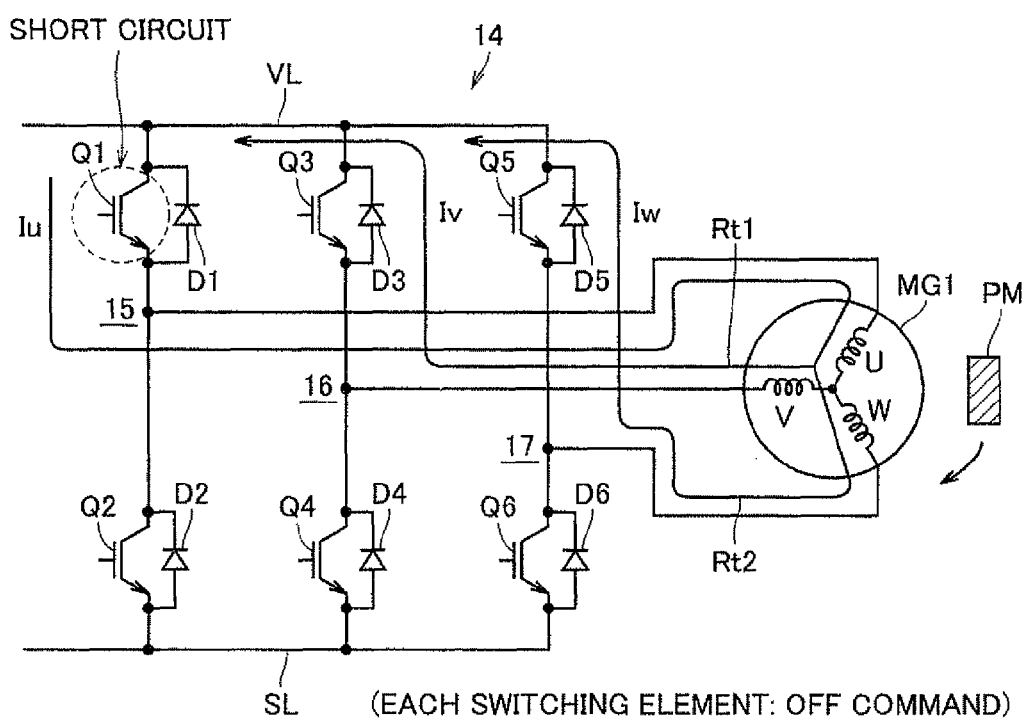
FIG. 4 is a diagram describing a short-circuit current within an inverter generated when a short-circuit fault occurs.

As shown in FIG. 4, a magnet PM attached to the rotor rotates with the rotation of motor generator MG1 during the limp-home operation. As a result, an induced voltage is generated at each phase coil of motor generator MG1.

FIG. 4 illustrates, as an example of a short-circuit fault in inverter 14, the case where a short-circuit fault in which a switching element is maintained in the ON state and goes out of control occurs in switching element Q1.

In such a case, even if the switching operation of each of switching elements Q1 to Q6 is controlled to stop (OFF state) in response to switching control signal STP, a short-circuit route through short-circuited switching element Q1 is formed. Specifically, U-phase motor current Iu flows from power supply line VL through switching element Q1 (short-circuit fault) to the U-phase coil. Then, U-phase motor current Iu is branched at the neutral point of motor generator MG1 to a route Rt1 extending from the V-phase coil through the midpoint of V-phase arm 16 and diode D3 to power supply line VL, and a route Rt2 extending from the W-phase coil through the midpoint of W-phase arm 17 and diode D5 to power supply line VL. For this reason, the induced voltage and a short-circuit current in accordance with the electrical resistance of the short-circuit route are generated.

The induced voltage generated at each phase coil of motor generator MG1 is proportional to the rotation speed of motor generator MG1. Therefore, as the rotation speed of motor generator MG2 during the limp-home operation increases, the induced voltage generated at motor generator MG1 also becomes higher and the short-circuit current in inverter 14 also increases. The excessive short-circuit current may lead to the occurrence of further damage to the elements resulting from the generation of the high temperature exceeding the heat-resistant temperature of the components of inverter 14.

Thus, the vehicle in Patent Document 1 as described above has a control configuration in which the level of the short-circuit current flowing through inverter 14 is monitored, and thereby limiting the limp-home operation using motor generator MG2 when the excessive short-circuit current flows through inverter 14. As a result, the occurrence of further damage to the elements within the inverter is prevented by performing the limp-home operation.

In such control configuration, however, while protection of the elements in the inverter can be achieved, an increase in the distance traveled during the limp-home operation is limited. Therefore, there is a possibility that the vehicle cannot be evacuated to a safe place.

Thus, hybrid drive apparatus 100 according to the present embodiment is configured such that switching of switching elements Q1 to Q6 forming inverter 14 is controlled in accordance with the rotation speed of motor generator MG1. With such a configuration, an increase in the short-circuit current due to an increase in the rotation speed is suppressed. Consequently, both the protection of the elements in the inverter and the increase in the distance traveled during the limp-home operation can be achieved.

A control structure for implementing the switching control of the inverter during the limp-home operation in hybrid drive apparatus 100 according to the present embodiment will be described hereinafter.

(Control Structure)

Figure 5:
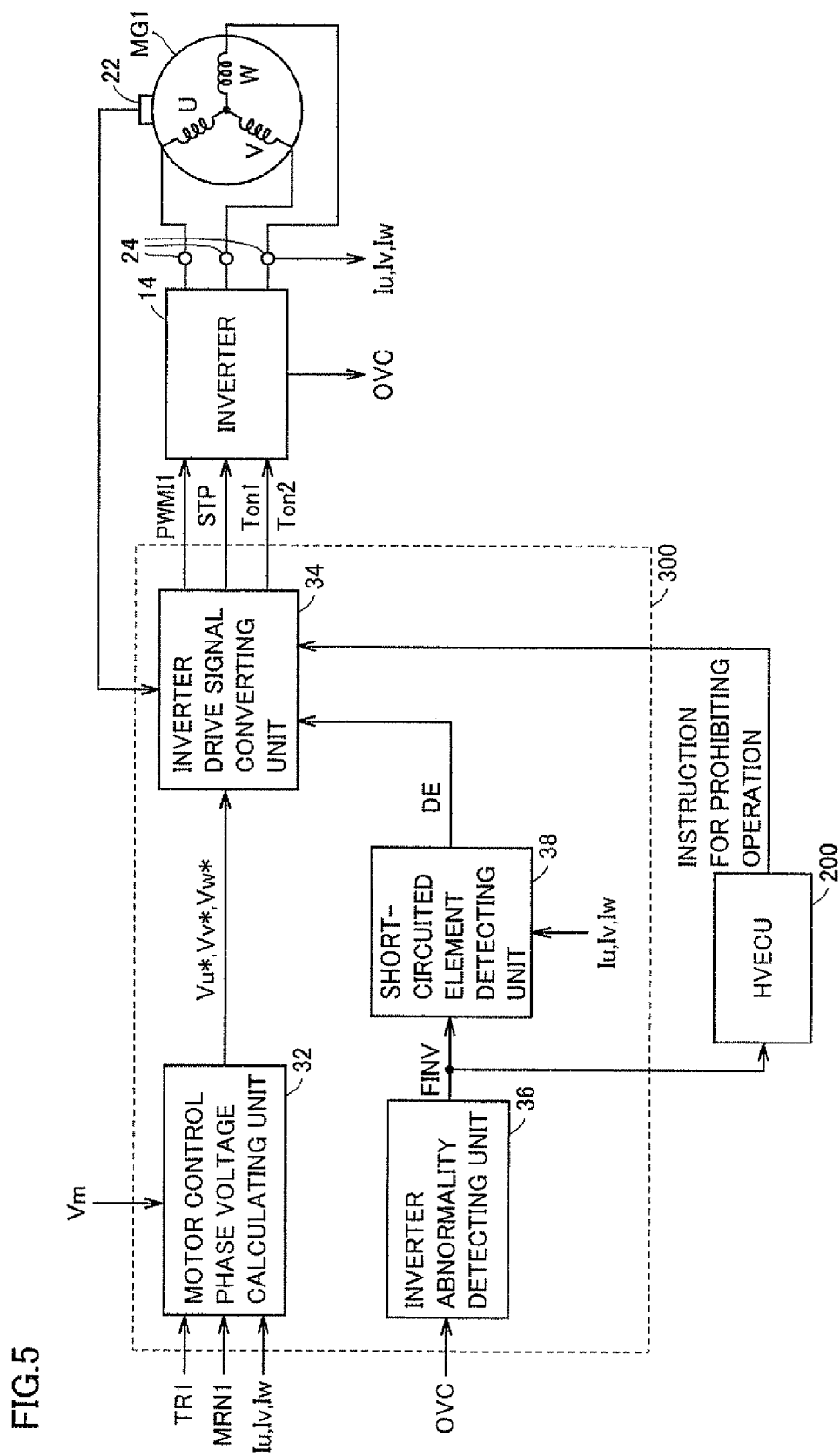
FIG. 5 is a block diagram illustrating a control structure in an MGECU according to the embodiment of the present invention.

FIG. 5 is a block diagram illustrating a control structure in MGECU 300 according to the embodiment of the present invention. Although each functional block shown in FIG. 5 is implemented typically by executing a program stored by MGECU 300 in advance, a part or all of the functions may be mounted as dedicated hardware.

Referring to FIG. 5, MGECU 300 includes, as means for controlling inverter 14, a motor control phase voltage calculating unit 32, an inverter drive signal converting unit 34, an inverter abnormality detecting unit 36, and a short-circuited element detecting unit 38. It is noted that, although not shown, MGECU 300 further includes means for controlling inverter 31 having a configuration similar to that in FIG. 5.

Motor control phase voltage calculating unit 32 receives torque command value TR1 and rotation speed command MRN1 as the operation command for motor generator MG1 from HVECU 200, receives input voltage Vm of inverter 14 from voltage sensor 13, and receives motor currents Iu, Iv and Iw flowing to the respective phases of motor generator MG1 from current sensor 24. Based on these input signals, motor control phase voltage calculating unit 32 calculates voltage amounts (that will also be referred to as voltage commands hereinafter) Vu*, Vv* and Vw* to be applied to the respective phase coils of motor generator MG1, and outputs the result of the calculation to inverter drive signal converting unit 34.

Inverter drive signal converting unit 34 generates switching control signal PWMI1 for actually turning on/off switching elements Q1 to Q6 of inverter 14, based on voltage commands Vu*, Vv* and Vw* of the respective phase coils from motor control phase voltage calculating unit 32, and delivers generated switching control signal PWMI1 to inverter 14.

As a result, switching of each of switching elements Q1 to Q6 is controlled, and each of switching elements Q1 to Q6 controls the current passed through each phase of motor generator MG1 such that motor generator MG1 outputs the commanded torque. In this manner, motor current MCRT1 is controlled and the motor torque in accordance with torque command value TR1 is output.

Inverter abnormality detecting unit 36 senses an abnormality that has occurred in inverter 14 during the operation of motor generator MG1. The abnormality in inverter 14 is sensed based on an overcurrent sense signal OVC from self-protection circuits built into switching elements Q1 to Q6 of inverter 14.

Specifically, the self-protection circuit is configured to include a current sensor (or a temperature sensor), and outputs overcurrent sense signal OVC in response to the overcurrent (or overheating) detected in a sensor output. When receiving overcurrent sense signal OVC from inverter 14, inverter abnormality detecting unit 36 determines that the abnormality occurs due to the short-circuit fault in switching elements Q1 to Q6, and generates an abnormality signal FINV indicating the result of the determination. Then, inverter abnormality detecting unit 36 delivers generated abnormality signal FINV to HVECU 200 and short-circuited element detecting unit 38.

When receiving abnormality signal FINV, HVECU 200 instructs the limp-home operation using motor generator MG2. At this time, HVECU 200 issues an instruction for stopping the switching operation of switching elements Q1 to Q6 forming inverter 14 to inverter drive signal converting unit 34.

In response to this, inverter drive signal converting unit 34 generates switching control signal STP for stopping (OFF state) the switching operation of switching elements Q1 to Q6, and outputs generated switching control signal STP to inverter 14. As a result, inverter 14 is set to a suspended state.

When receiving abnormality signal FINV from inverter abnormality detecting unit 36, short-circuited element detecting unit 38 detects a short-circuited switching element from the inverter where the abnormality has occurred, based on current values Iu, Iv and Iw of the respective phases between inverter 14 and motor generator MG1 that are detected by current sensor 24. As an example, short-circuited element detecting unit 38 detects a value offset from that obtained at the time of the steady operation, for each of the current waveforms of motor currents Iu, Iv and Iw, and detects the short-circuited switching element based on the magnitude and the polarity of the detected offset value. Then, short-circuited element detecting unit 38 generates a signal DE indicating the short-circuited switching element that has been detected, and delivers signal DE to inverter drive signal converting unit 34.

When receiving signal DE from short-circuited element detecting unit 38, inverter drive signal converting unit 34 generates any one of a switching control signal Ton1 and a switching control signal Ton2, in accordance with a rotation speed Nmg1 of motor generator MG1 derived from the value detected by position sensor 22.

Specifically, switching control signal Ton1 is a signal for controlling the switching operation to turn on only a switching element connected in series to the short-circuited switching element among switching elements Q1 to Q6 forming inverter 14. As a result, since the short-circuited switching element and the switching element connected in series to the short-circuited switching element are turned on, a short circuit is caused in a phase configured by these two switching elements. The switching control for causing the short circuit in the phase to which the short-circuited switching element belongs as described above will also be simply referred to as "one-phase short-circuit control" hereinafter.

In contrast to this, switching control signal Ton2 is a signal for controlling the switching operation to turn on all switching elements connected in parallel to the short-circuited switching element in the power supply line (or ground line)

among switching elements Q1 to Q6 forming inverter 14. As a result, the switching elements in all of the three phases connected in parallel in the power supply line (or ground line) are turned on. The switching control for turning on the switching elements connected in parallel to the short-circuited switching element in the power supply line as described above will also be simply referred to as "three-phase ON control" hereinafter.

Inverter drive signal converting unit 34 switches between and exercises the one-phase short-circuit control and the three-phase ON control, in accordance with rotation speed Nmg1 of motor generator MG1 derived from the value detected by position sensor 22. The details of each switching control will be described hereinafter.

Figure 6:
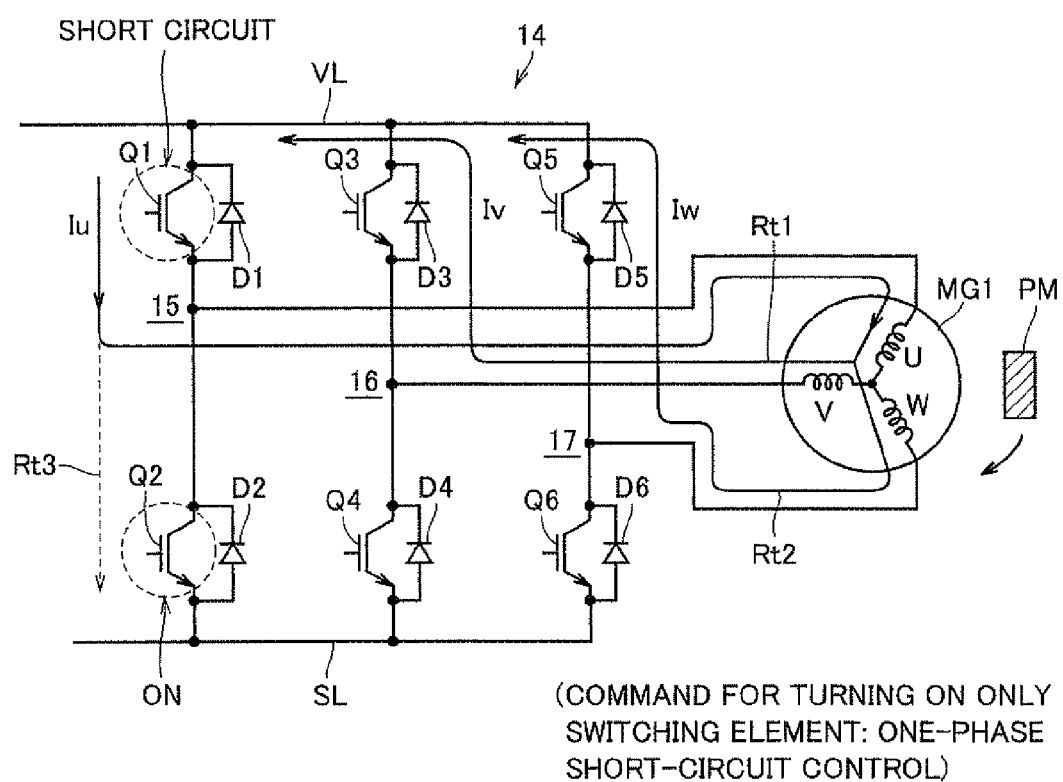
FIG. 6 is a diagram describing the short-circuit current within the inverter generated when a one-phase short-circuit control is exercised.

FIG. 6 is a diagram describing the short-circuit current within the inverter generated when the one-phase short-circuit control is exercised.

Referring to FIG. 6, when the short-circuit fault occurs in switching element Q1, only switching element Q2 connected in series to switching element Q1 is turned on in response to switching control signal Ton1. Consequently, a short circuit is caused in U-phase arm 15, and a new route Rt3 extending from power supply line VL through the midpoint of U-phase arm 15 to ground line SL is formed as the route for U-phase motor current Iu, in addition to routes Rt1 and Rt2 described with reference to FIG. 4. As a result, a current flowing through the short-circuit route formed between short-circuited switching element Q1 and diodes D3 and D5 is reduced. At this time, motor currents Iu, Iv and Iw of the respective phases show AC waveforms having substantially the same amplitude, similarly to the waveform during the normal operation of motor generator MG1. It is noted that the amplitude of the motor currents of the respective phases becomes larger by increasing the rotation speed of motor generator MG1, as will be described hereinafter.

Figure 7:
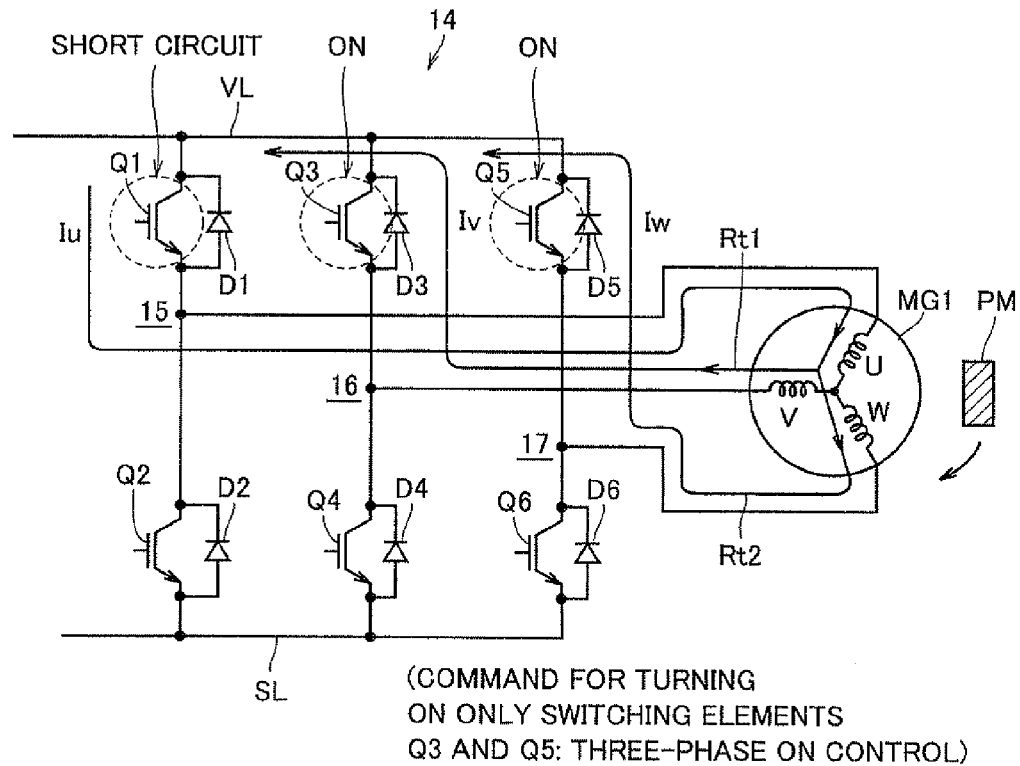
FIG. 7 is a diagram describing the short-circuit current within the inverter generated when a three-phase ON control is exercised.

FIG. 7 is a diagram describing the short-circuit current within the inverter generated when the three-phase ON control is exercised.

Referring to FIG. 7, when the short-circuit fault occurs in switching element Q1 as in FIG. 6, only switching elements Q3 and Q5 connected in parallel to switching element Q1 in power supply line VL are turned on in response to switching control signal Ton2. As a result, a route formed between switching element Q3 and diodes D1 and D5 as well as a route formed between switching element Q5 and diodes D1 and D3 are newly formed, in addition to the short-circuit route formed between short-circuited switching element Q1 and diodes D3 and D5.

Figure 8:
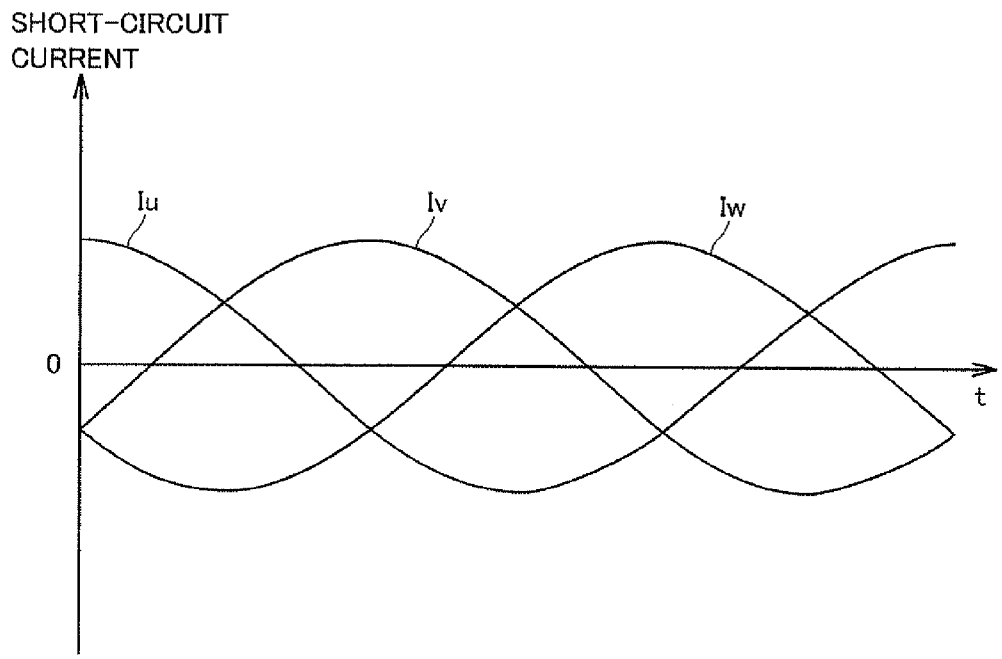
FIG. 8 illustrates output waveforms of motor currents generated when the three-phase ON control is exercised.

FIG. 8 illustrates output waveforms of the motor currents generated when the three-phase ON control is exercised. It is noted that the output waveforms in FIG. 8 are obtained by simulating motor currents Iu, Iv and Iw induced when motor generator MG1 is rotated at a prescribed rotation speed in the circuit configuration shown in FIG. 7.

As is clear from FIG. 8, motor currents Iu, Iv and Iw show the AC waveforms having substantially the same amplitude. As will be described hereinafter, it is obtained from the result of the simulation that the amplitude of the motor currents hardly changes even if the rotation speed of motor generator MG1 is increased.

Figure 9:
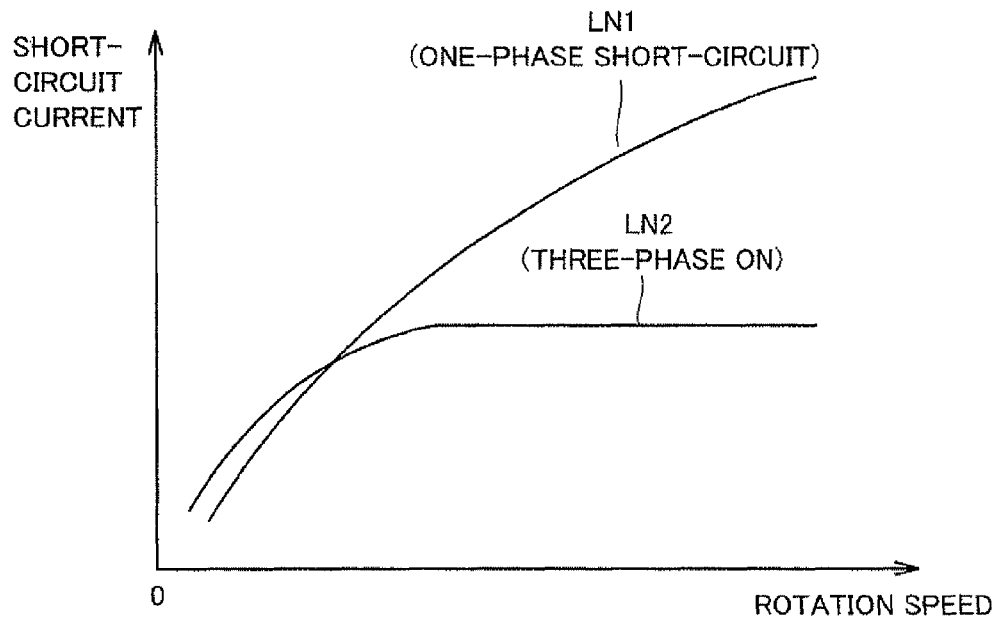
FIG. 9 illustrates the relationship between the rotation speed of a motor generator MG1 and the short-circuit currents within the inverter generated when the one-phase short-circuit control and the three-phase ON control are exercised.

FIG. 9 illustrates the relationship between the rotation speed of motor generator MG1 and the short-circuit currents within the inverter generated when the one-phase short-circuit control and the three-phase ON control are exercised. The relationship shown in FIG. 9 is obtained by simulating motor currents Iu, Iv and Iw that, when motor generator MG1 is rotated at various rotation speeds, is induced at each of the rotation speeds, in the circuit configurations shown in FIGS. 6 and 7. It is noted that, in FIG. 9, a line LN1 indicates the short-circuit current generated when the one-phase short-circuit control is exercised, and a line LN2 indicates the short-circuit current generated when the three-phase ON control is exercised.

Referring to FIG. 9, when the one-phase short-circuit control is exercised, the short-circuit current flowing through inverter 14 increases as the rotation speed of motor generator MG1 increases. In contrast to this, when the three-phase ON control is exercised, the short-circuit current flowing through inverter 14 increases as the rotation speed of motor generator MG1 increases in a relatively low rotation speed region, whereas in a relatively high rotation speed region, the short-circuit current hardly changes even if the rotation speed increases.

It is noted that one of the reasons why the short-circuit current does not increase even if the rotation speed increases when the three-phase ON control is exercised is that an inductance component of each phase coil of motor generator MG1 among the electrical resistance of the short-circuit routes formed as a result of the three-phase ON control becomes higher as the rotation speed increases.

Furthermore, it can be seen from FIG. 9 that the short-circuit current generated when the one-phase short-circuit control is exercised intersects with the short-circuit current generated when the three-phase ON control is exercised at a prescribed relatively low rotation speed, and the magnitude relationship is inverted with the prescribed rotation speed being a boundary. Thus, according to the relationship between the short-circuit current and the rotation speed of motor generator MG1 shown in FIG. 9, it can be seen that, with a configuration in which the one-phase short-circuit control is exercised in the low rotation speed region and the three-phase ON control is exercised in the high rotation speed region, the increase in the short-circuit current flowing through inverter 14 can be effectively suppressed.

On the other hand, the braking torque is generated by the rotation of motor generator MG1 with the rotation of motor generator MG2. This braking torque acts on the vehicle based on the rotational resistance of motor generator MG1, and therefore, it is also referred to as "drag torque." The relationship as shown in FIG. 10 is established between this drag torque and the rotation speed of motor generator MG1.

Figure 10:
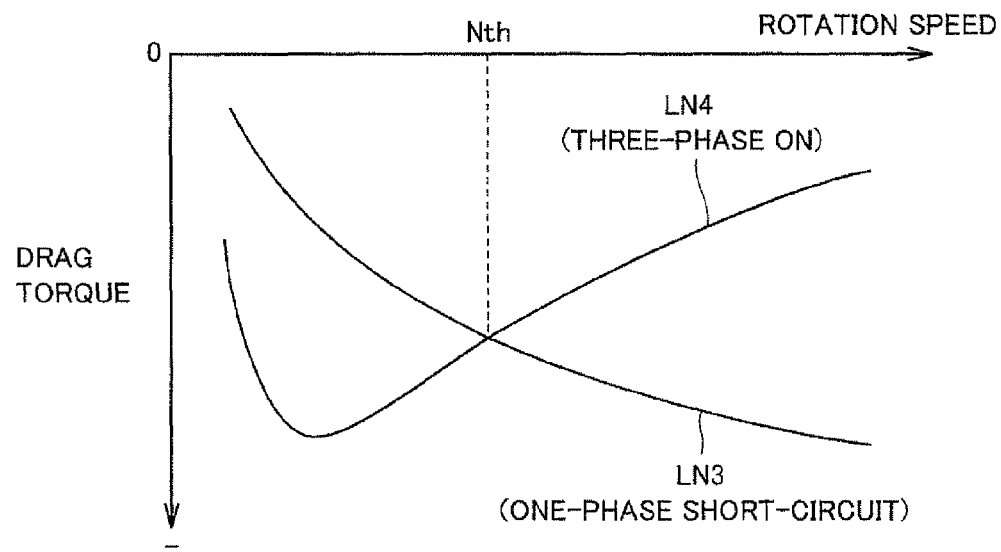
FIG. 10 illustrates the relationship between the rotation speed of motor generator MG1 and the drag torque generated at motor generator MG1 when the one-phase short-circuit control and the three-phase ON control are exercised.

FIG. 10 illustrates the relationship between the rotation speed of motor generator MG1 and the drag torque generated at motor generator MG1 when the one-phase short-circuit control and the three-phase ON control are exercised. The relationship shown in FIG. 10 is obtained by using the magnetic field analysis to simulate the drag torque generated at motor generator MG1 when the short-circuit current in FIG. 9 is flowing, for each of the one-phase short-circuit control and the three-phase ON control. It is noted that the drag torque is indicated by a negative value in order to distinguish the drag torque from torque generated during power running control over motor generator MG1.

In FIG. 10, a line LN3 indicates the drag toque generated when the one-phase short-circuit control is exercised, and a line LN4 indicates the drag torque generated when the three-phase ON control is exercised.

It can be seen from FIG. 10 that, when the one-phase short-circuit control is exercised, the drag torque (absolute value) becomes larger as the rotation speed of motor generator MG1 increases. In contrast to this, it is likely that, when the three-phase ON control is exercised, the drag torque has an extreme value at a prescribed rotation speed in the low rotation speed region, and becomes smaller as the rotation speed increases from this prescribed rotation speed.

In other words, the characteristic of the drag torque generated when the one-phase short-circuit control is exercised is different from that of the drag torque generated when the three-phase ON control is exercised, and the magnitude relationship is inverted with a prescribed reference rotation speed Nth in the figure being a boundary. According to this, in the rotation speed that is lower than prescribed reference rotation speed Nth, if the three-phase ON control is exercised, the drag torque increases as compared to that generated when the one-phase short-circuit control is exercised. In particular, at the start of traveling of hybrid vehicle 10, the drag torque exceeds the torque generated by motor generator MG2, and therefore, the drivability may be lowered.

Accordingly, with a configuration in which the one-phase short-circuit control is exercised when the rotation speed of motor generator MG1 is less than or equal to prescribed reference rotation speed Nth, and the three-phase ON control is exercised when rotation speed Nmg1 is higher than prescribed reference rotation speed Nth, the drag torque can be suppressed, regardless of the rotation speed of motor generator MG1.

Furthermore, in light of the relationship between the short-circuit current and the rotation speed of motor generator MG1 shown in FIG. 9, the generation of the excessive short-circuit current can be prevented in the rotation speed region that is higher than prescribed reference rotation speed Nth.

In reality, referring again to FIG. 5, when inverter drive signal converting unit 34 receives signal DE from short-circuited element detecting unit 38, inverter drive signal converting unit 34 derives rotation speed Nmg1 of motor generator MG1 from the value detected by position sensor 22, and determines whether or not derived rotation speed Nmg1 exceeds prescribed reference rotation speed Nth. At this time, when rotation speed Nmg1 is less than or equal to prescribed reference rotation speed Nth, inverter drive signal converting unit 34 generates switching control signal Ton1 for exercising the one-phase short-circuit control. On the other hand, when rotation speed Nmg1 exceeds prescribed reference rotation speed Nth, inverter drive signal converting unit 34 generates switching control signal Ton2 for exercising the three-phase ON control. It is noted that prescribed reference rotation speed Nth can be determined in advance by simulating the relationship shown in FIG. 10.

Figure 11:
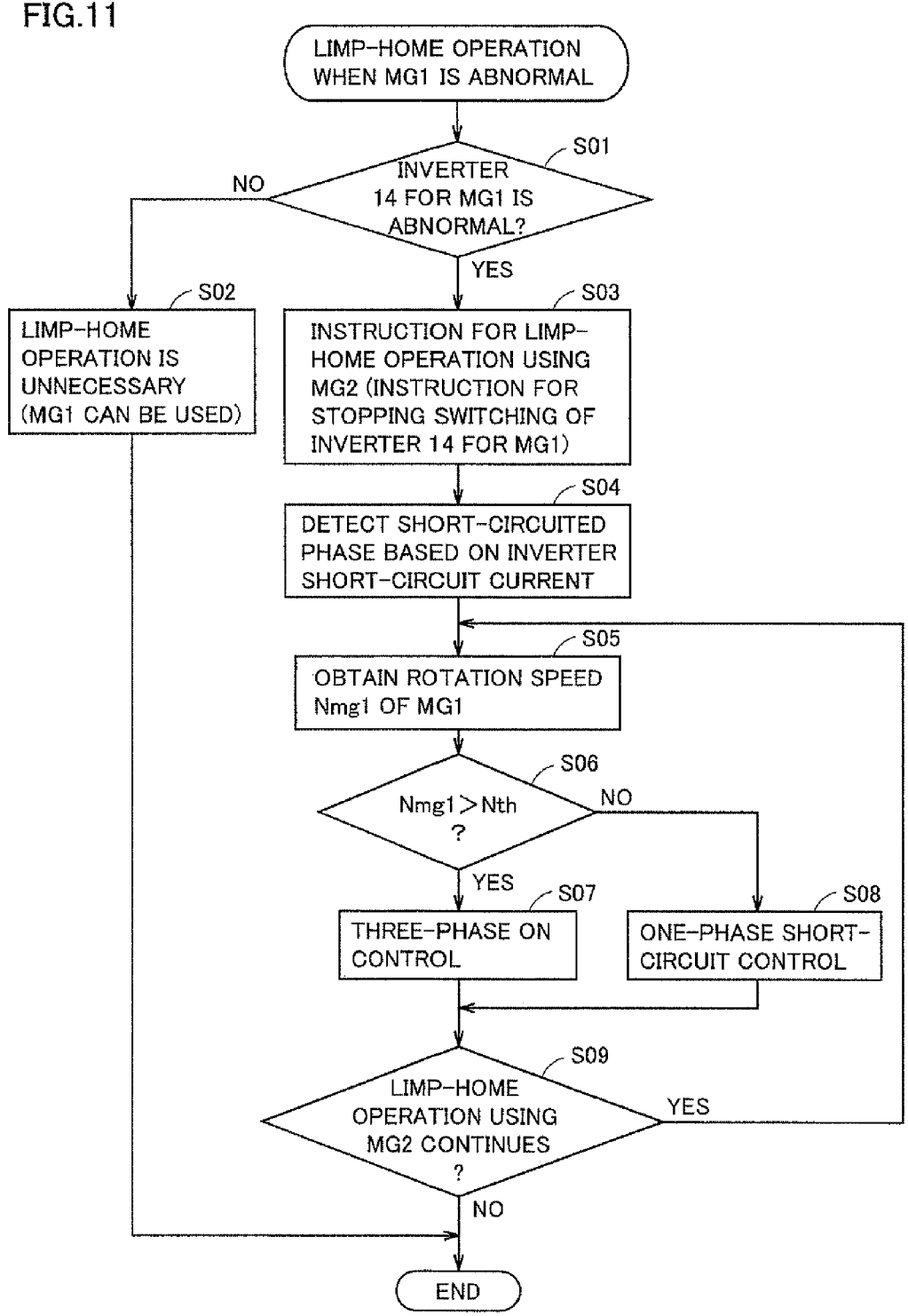
FIG. 11 is a flowchart describing the limp-home operation when MG1 in the hybrid drive apparatus according to the embodiment of the present invention is abnormal.

FIG. 11 is a flowchart describing the limp-home operation when MG1 in the hybrid drive apparatus according to the embodiment of the present invention is abnormal. It is noted that the process in each step shown in FIG. 11 is implemented by MGECU 300 and HVECU 200 functioning as each functional block shown in FIG. 5.

Referring to FIG. 11, MGECU 300 functioning as inverter abnormality detecting unit 36 (FIG. 5) determines whether or not the abnormality is occurring in inverter 14 connected to motor generator MG1 (step S01). At this time, MGECU 300 determines whether or not MGECU 300 receives overcurrent sense signal OCV from the self-protection circuits built into switching elements Q1 to Q6. If MGECU 300 does not receive overcurrent sense signal OCV from inverter 14, MGECU 300 determines that the abnormality is not occurring in inverter 14 (NO determination in step S01), and MGECU 300 does not instruct the limp-home operation (step S02), and ends the control process related to the limp-home operation.

On the other hand, if MGECU 300 receives overcurrent sense signal OCV from inverter 14, MGECU 300 determines that the abnormality is occurring in inverter 14 (YES determination in step S01) and issues abnormality signal FINV. As a result, HVECU 200 instructs the limp-home operation using motor generator MG2 (step S03). At this time, HVECU 200 issues the instruction for stopping the switching operation of each of switching elements Q1 to Q6 forming inverter 14. In response to this, switching control signal PWMI1 from MGECU 300 is set to the OFF state.

Furthermore, if MGECU 300 functioning as short-circuited element detecting unit 38 receives abnormality signal FINV, MGECU 300 detects the short-circuited switching element from the inverter where the abnormality has occurred, based on current values Iu, Iv and Iw of the respective phases between inverter 14 and motor generator MG1 that are detected by current sensor 24 (step S04). Then, MGECU 300 functioning as short-circuited element detecting unit 38 generates signal DE indicating the short-circuited switching element that has been detected, and delivers signal DE to MGECU 300 functioning as inverter drive signal converting unit 34.

Next, if MGECU 300 functioning as inverter drive signal converting unit 34 receives signal DE from short-circuited element detecting unit 38, MGECU 300 obtains rotation speed Nmg1 of motor generator MG1 based on the value detected by position sensor 22 (step S05). Then, MGECU 300 functioning as inverter drive signal converting unit 34 determines whether or not rotation speed Nmg1 exceeds prescribed reference rotation speed Nth (step S06).

If rotation speed Nmg1 exceeds prescribed reference rotation speed Nth (YES in step S06), MGECU 300 functioning as inverter drive signal converting unit 34 exercises the three-phase ON control (step S07). Specifically, MGECU 300 generates switching control signal Ton2 and outputs switching control signal Ton2 to switching elements Q1 to Q6 forming inverter 14. As a result, all of the switching elements connected in parallel to the short-circuited switching element in the power supply line (or ground line) are turned on.

On the other hand, if rotation speed Nmg1 is less than or equal to prescribed reference rotation speed Nth (NO in step S06), MGECU 300 functioning as inverter drive signal converting unit 34 exercises the one-phase short-circuit control (step S08). Specifically, MGECU 300 generates switching control signal Ton1 and outputs switching control signal Ton1 to switching elements Q1 to Q6 forming inverter 14. As a result, the switching element connected in series to the short-circuited switching element is turned on.

Then, MGECU 300 functioning as inverter drive signal converting unit 34 determines whether or not the limp-home operation using motor generator MG2 continues (step S09). If the limp-home operation continues (YES in step S09), the process is returned to step S05.

On the other hand, if the limp-home operation does not continue (NO in step S09), MGECU 300 ends the control process related to the limp-home operation.

With such control configuration, the excessive short-circuit current flowing through inverter 14 can be prevented even when the rotation speed of motor generator MG2 during the limp-home operation increases. As a result, the distance traveled during the limp-home operation can be extended without causing damage to the elements within the inverter.

In addition, the drag torque generated at motor generator MG1 with the rotation of motor generator MG2 can be made small when the rotation speed of motor generator MG2 during the limp-home operation is low. As a result, at the start of traveling of hybrid vehicle 10, the drag torque exceeds the torque generated by motor generator MG2, and lowering of the drivability can be suppressed.

Although the case where the limp-home operation using motor generator MG2 is performed when the abnormality occurs in inverter 14 serving as the power converting device connected to motor generator MG1 has been described in the present embodiment, the limp-home operation using engine ENG and motor generator MG1 is also performed by performing the process similar to the flowchart shown in FIG. 11, when the abnormality occurs in inverter 31 serving as the power converting device connected to motor generator MG2. Thereby, the distance traveled during the limp-home operation can be extended while the excessive short-circuit current flowing through inverter 31 is prevented.

In addition, although the motor drive apparatus in the hybrid vehicle including the two motors coupled to each other by the power split device has been described as an example in the present embodiment, application of the present invention is not limited to such a type. The present invention is also applicable to any type of hybrid drive apparatus such as a so-called electric power distribution-type apparatus, and a motor drive apparatus other than the hybrid drive apparatus configured to include the plurality of motors, as long as the apparatus is configured such that one motor is operated and another motor is rotated with the operation of the one motor during the limp-home operation.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

INDUSTRIAL APPLICABILITY

The present invention is applicable to a motor drive apparatus and a hybrid drive apparatus configured to include a plurality of motors coupled to be capable of outputting motive power to a common output shaft.

The invention claimed is:

1. A motor drive apparatus, comprising:
   a plurality of multiphase AC motors coupled to be capable of outputting motive power to a common output shaft;
   a plurality of power converting devices connected to said plurality of multiphase AC motors, respectively; and
   a controller for controlling said plurality of power converting devices,
   each of said plurality of power converting devices including a plurality of arm circuits connected to respective phase coils of said multiphase AC motor,
   each of said plurality of arm circuits having first and second switching elements connected in series between first and second power supply lines with a connection point to said each phase coil interposed, and
   said controller including
   an abnormality control means, when a first power converting device among said plurality of power converting devices is abnormal, for instructing an abnormal state operation using a second multiphase AC motor different from a first multiphase AC motor connected to said first power converting device,
   a short circuit detecting means for detecting a short-circuited switching element based on a current flowing through said first power converting device as a result of operation of said second multiphase AC motor, in said abnormal state operation,
   a first motor control means for controlling the current flowing through said first power converting device by bringing into conduction a switching element connected in series to said short-circuited switching element with said connection point interposed, in said abnormal state operation,
   a second motor control means for controlling the current flowing through said first power converting device by bringing into conduction all of switching elements connected in parallel to said short-circuited switching element in the power supply line, in said abnormal state operation, and
   a selecting means for selectively setting said first motor control means and said second motor control means in accordance with a rotation speed of said first multiphase AC motor.

2. The motor drive apparatus according to claim 1, wherein said selecting means selects said first motor control means when the rotation speed of said first multiphase AC motor is less than or equal to a prescribed reference rotation speed, and selects said second motor control means when the rotation speed of said first multiphase AC motor exceeds said prescribed reference rotation speed.

3. The motor drive apparatus according to claim 2, wherein when said first motor control means is executed, said first multiphase AC motor has a first characteristic that braking torque generated as a result of operation of said second multiphase AC motor becomes larger as the rotation speed of said first multiphase AC motor increases,
when said second motor control means is executed, said first multiphase AC motor has a second characteristic that the braking torque generated as a result of operation of said second multiphase AC motor becomes smaller as the rotation speed of said first multiphase AC motor increases, and
said selecting means has said first and second characteristics in advance, and sets, to said prescribed reference rotation speed, the rotation speed of said first multiphase AC motor when the braking torque generated at said first multiphase AC motor having said first characteristic matches that generated at said first multiphase AC motor having said second characteristic.

4. A motor drive apparatus, comprising:
   a plurality of multiphase AC motors coupled to be capable of outputting motive power to a common output shaft;
   a plurality of power converting devices connected to said plurality of multiphase AC motors, respectively; and
   a controller for controlling said plurality of power converting devices,
   each of said plurality of power converting devices including a plurality of arm circuits connected to respective phase coils of said multiphase AC motor,
   each of said plurality of arm circuits having first and second switching elements connected in series between first and second power supply lines with a connection point to said each phase coil interposed, and
   said controller including
   an abnormality control unit, when a first power converting device among said plurality of power converting devices is abnormal, for instructing an abnormal state operation using a second multiphase AC motor different from a first multiphase AC motor connected to said first power converting device,
   a short circuit detecting unit for detecting a short-circuited switching element based on a current flowing through said first power converting device as a result of operation of said second multiphase AC motor, in said abnormal state operation, a first motor control unit for controlling the current flowing through said first power converting device by bringing into conduction a switching element connected in series to said short-circuited switching element with said connection point interposed, in said abnormal state operation, a second motor control unit for controlling the current flowing through said first power converting device by bringing into conduction all of switching elements connected in parallel to said short-circuited switching element in the power supply line, in said abnormal state operation, and a selecting unit for selectively setting said first motor control unit and said second motor control unit in accordance with a rotation speed of said first multiphase AC motor.

5. The motor drive apparatus according to claim 4, wherein said selecting unit selects said first motor control unit when the rotation speed of said first multiphase AC motor is less than or equal to a prescribed reference rotation speed, and selects said second motor control unit when the rotation speed of said first multiphase AC motor exceeds said prescribed reference rotation speed.

6. The motor drive apparatus according to claim 5, wherein when said first motor control unit is executed, said first multiphase AC motor has a first characteristic that braking torque generated as a result of operation of said second multiphase AC motor becomes larger as the rotation speed of said first multiphase AC motor increases, when said second motor control unit is executed, said first multiphase AC motor has a second characteristic that the braking torque generated as a result of operation of said second multiphase AC motor becomes smaller as the rotation speed of said first multiphase AC motor increases, and said selecting unit has said first and second characteristics in advance, and sets, to said prescribed reference rotation speed, the rotation speed of said first multiphase AC motor when the braking torque generated at said first multiphase AC motor having said first characteristic matches that generated at said first multiphase AC motor having said second characteristic.

7. A hybrid drive apparatus, comprising:
an engine operated by fuel;
a first motor generator;
an output member for outputting motive power;
a power split device coupling said output member, an output shaft of said engine and an output shaft of said first motor generator to one another;
a second motor generator coupled to said output member;
a first inverter connected between a DC power supply and said first motor generator, for drive control of said first motor generator;
a second inverter connected between said DC power supply and said second motor generator, for drive control of said second motor generator; and
a controller for controlling operation of said first and second motor generators,
said first inverter including a plurality of first arm circuits connected to respective phase coils of said first motor generator,
said second inverter including a plurality of second arm circuits connected to respective phase coils of said second motor generator,
each of said plurality of first and second arm circuits having first and second switching elements connected in series between first and second power supply lines with a connection point to said each phase coil interposed, and said controller including
an abnormality control means for instructing an abnormal state operation using said second motor generator, when said first inverter is abnormal, a short circuit detecting means for detecting a short-circuited switching element based on a current flowing through said first inverter as a result of operation of said second motor generator, in said abnormal state operation, a first motor control means for controlling the current flowing through said first inverter by bringing into conduction a switching element connected in series to said short-circuited switching element with said connection point interposed, in said abnormal state operation, a second motor control means for controlling the current flowing through said first inverter by bringing into conduction all of switching elements connected in parallel to said short-circuited switching element in the power supply line, in said abnormal state operation, and a first selecting means for selectively setting said first motor control means and said second motor control means in accordance with a rotation speed of said first motor generator.

8. The hybrid drive apparatus according to claim 7, wherein said first selecting means selects said first motor control means when the rotation speed of said first motor generator is less than or equal to a prescribed reference rotation speed, and selects said second motor control means when the rotation speed of said first motor generator exceeds said prescribed reference rotation speed.

9. The hybrid drive apparatus according to claim 7, wherein said abnormality control means instructs the abnormal state operation using said engine and said first motor generator, when said second inverter is abnormal, said short circuit detecting means detects the short-circuited switching element based on a current flowing through said second inverter as a result of operation of said first motor generator, in said abnormal state operation, and said controller further includes
a third motor control means for controlling the current flowing through said second inverter by bringing into conduction the switching element connected in series to said short-circuited switching element with said connection point interposed, in said abnormal state operation, a fourth motor control means for controlling the current flowing through said second inverter by bringing into conduction all of the switching elements connected in parallel to said short-circuited switching element in the power supply line, in said abnormal state operation, and a second selecting means for selectively setting said third motor control means and said fourth motor control means in accordance with a rotation speed of said second motor generator.

10. The hybrid drive apparatus according to claim 9, wherein
said second selecting means selects said third motor control means when the rotation speed of said second motor generator is less than or equal to a prescribed reference rotation speed, and selects said fourth motor control means when the rotation speed of said second motor generator exceeds said prescribed reference rotation speed.

11. A method for controlling a motor drive apparatus including a plurality of multiphase AC motors coupled to be capable of outputting motive power to a common output shaft and a plurality of power converting devices connected to said plurality of multiphase AC motors, respectively, each of said plurality of power converting devices including a plurality of arm circuits connected to respective phase coils of said multiphase AC motor, each of said plurality of arm circuits having first and second switching elements connected in series between first and second power supply lines with a connection point to said each phase coil interposed, and said method for controlling comprising the steps of:

instructing an abnormal state operation using a second multiphase AC motor different from a first multiphase AC motor connected to a first power converting device among said plurality of power converting devices, when said first power converting device is abnormal;

detecting a short-circuited switching element based on a current flowing through said first power converting device as a result of operation of said second multiphase AC motor, in said abnormal state operation;

controlling the current flowing through said first power converting device by bringing into conduction a switching element connected in series to said short-circuited switching element with said connection point interposed, in said abnormal state operation;

controlling the current flowing through said first power converting device by bringing into conduction all of switching elements connected in parallel to said short-circuited switching element in the power supply line, in said abnormal state operation; and in accordance with a rotation speed of said first multiphase AC motor, selectively setting the step of controlling the current flowing through said first power converting device by bringing into conduction the switching element connected in series to said short-circuited switching element with said connection point interposed, and the step of controlling the current flowing through said first power converting device by bringing into conduction all of the switching elements connected in parallel to said short-circuited switching element in said power supply line.

12. The method for controlling a motor drive apparatus according to claim 11, wherein said step of selectively setting selects the step of controlling the current flowing through said first power converting device by bringing into conduction the switching element connected in series to said short-circuited switching element with said connection point interposed, when the rotation speed of said first multiphase AC motor is less than or equal to a prescribed reference rotation speed, and selects the step of controlling the current flowing through said first power converting device by bringing into conduction all of the switching elements connected in parallel to said short-circuited switching element in said power supply line, when the rotation speed of said first multiphase AC motor exceeds said prescribed reference rotation speed.

\* \* \* \* \*